(12) United States Patent
Sasaki

(10) Patent No.: US 6,392,852 B1
(45) Date of Patent: May 21, 2002

(54) THIN-FILM MAGNETIC HEAD AND METHOD OF MANUFACTURING SAME, AND MAGNETORESISTIVE DEVICE

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/540,873

(22) Filed: Mar. 31, 2000

(30) Foreign Application Priority Data

Apr. 27, 1999 (JP) .......................................... 11-119476

(51) Int. Cl.⁷ ............................................... G11B 5/127
(52) U.S. Cl. ...................................................... 360/320
(58) Field of Search .............................. 360/320, 317, 360/327, 322; 29/603.1

(56) References Cited

U.S. PATENT DOCUMENTS 5,751,522 A * 5/1998 Yamada et al.
5,907,459 A * 5/1999 Shouji et al.

\* cited by examiner

*Primary Examiner*—Allen Cao
(74) *Attorney, Agent, or Firm*—Oliff & Berridge, PLC

(57) ABSTRACT

It is an object of the invention to prevent a short circuit between a shield layer and a magnetoresistive element or a conductive layer connected thereto. A thin-film magnetic head comprises a reproducing head and a recording head. The reproducing head includes: an MR element; a bottom shield layer and a top shield layer for shielding the MR element; a first conductive layer connected to the MR element; a bottom shield gap film placed between the bottom shield layer and the MR element and the conductive layer; a top shield gap film placed between the top shield layer and the MR element and the conductive layer; and a second conductive layer connected to the first conductive layer through a contact hole formed in the top shield gap film. The contact hole provided for connecting the first conductive layer to the second conductive layer is formed after a first layer of the top shield layer is formed on the top shield gap film.

13 Claims, 14 Drawing Sheets

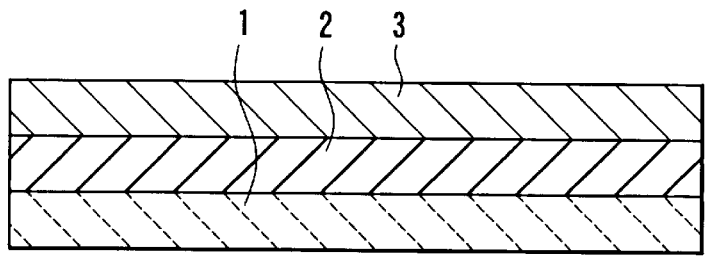
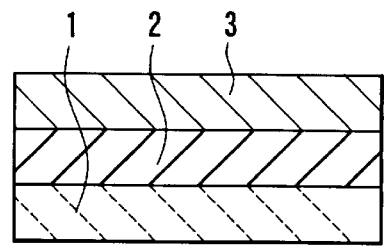
FIG. 1A  FIG. 1B
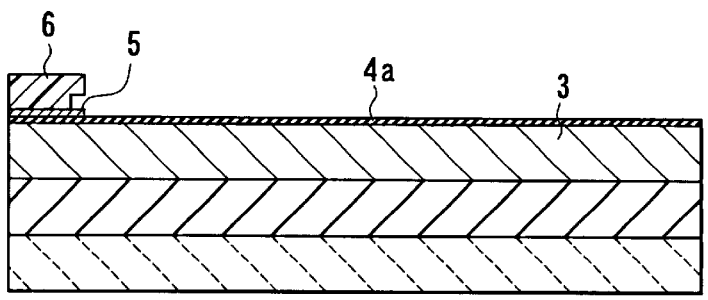
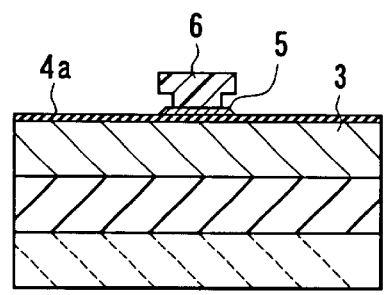
FIG. 2A  FIG. 2B
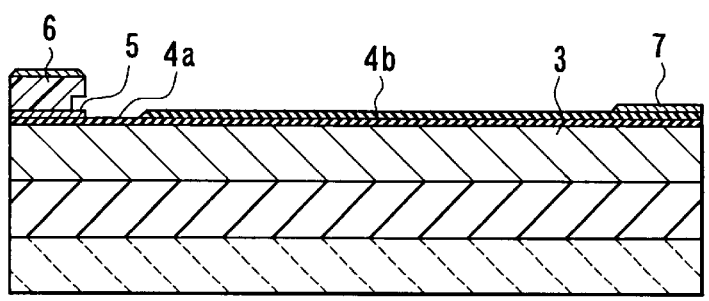
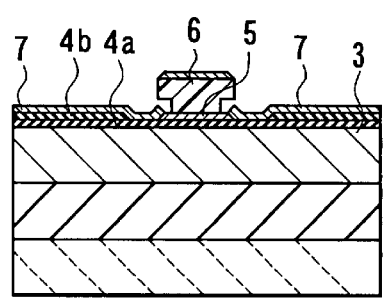
FIG. 3A  FIG. 3B

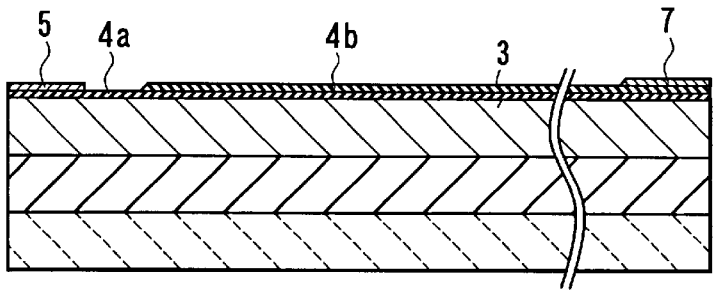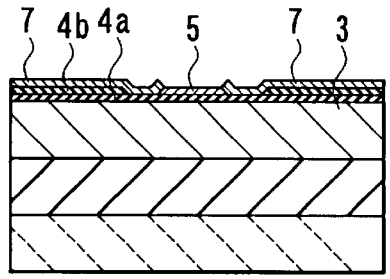
FIG. 4A  FIG. 4B
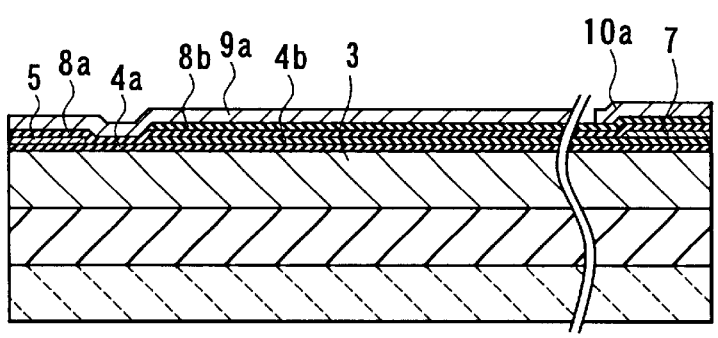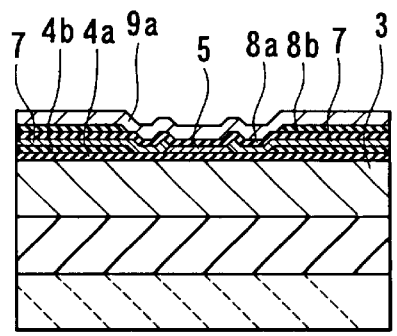
FIG. 5A  FIG. 5B
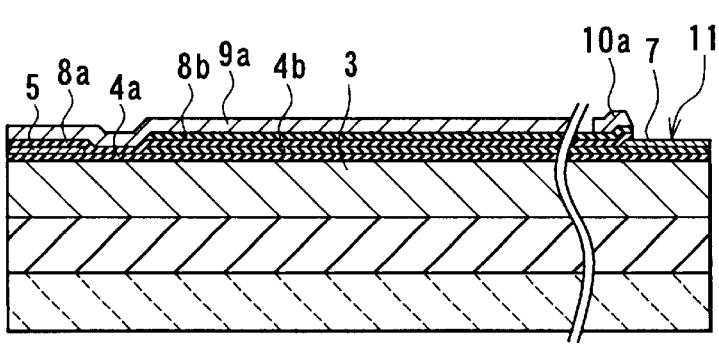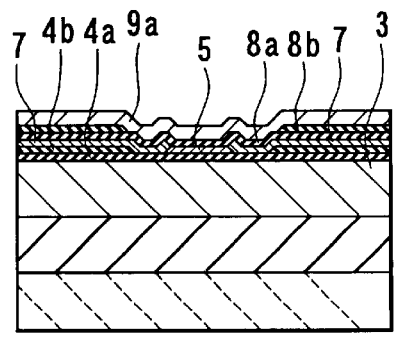
FIG. 6A  FIG. 6B

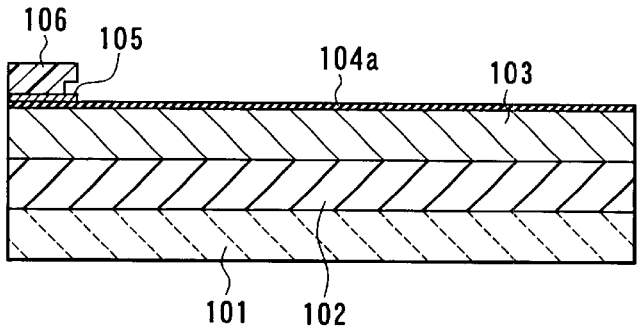
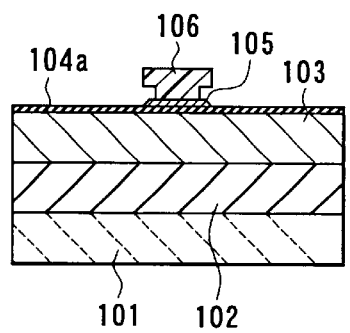
FIG. 14A
RELATED ART
FIG. 14B
RELATED ART
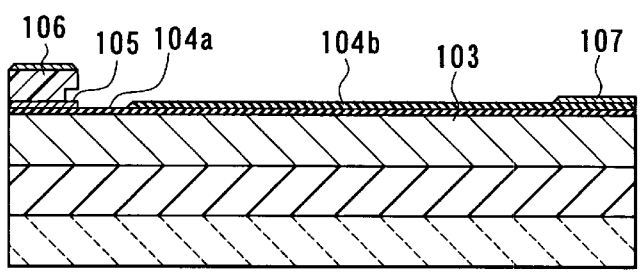
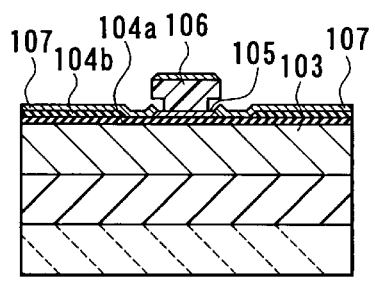
FIG. 15A
RELATED ART
FIG. 15B
RELATED ART

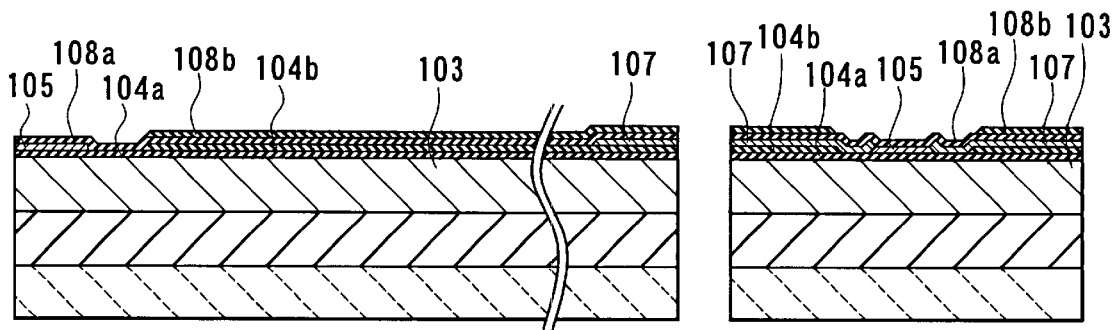
FIG. 16A
RELATED ART
FIG. 16B
RELATED ART
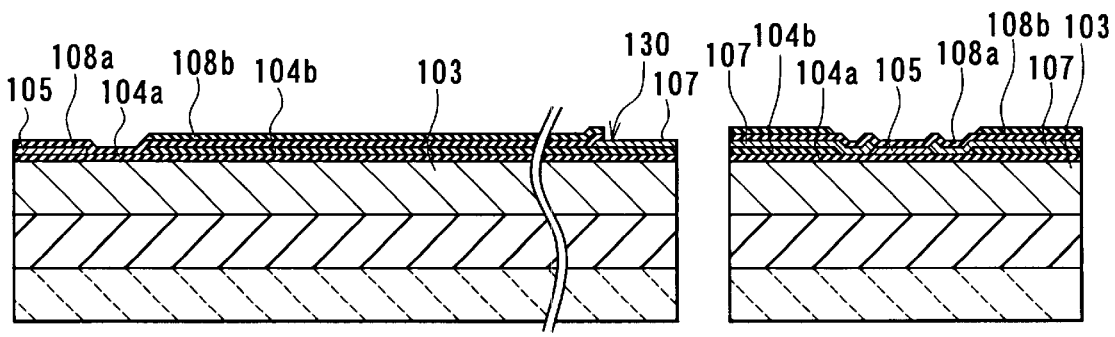
FIG. 17A
RELATED ART
FIG. 17B
RELATED ART

THIN-FILM MAGNETIC HEAD AND METHOD OF MANUFACTURING SAME, AND MAGNETORESISTIVE DEVICE

BACKGROUND OF THE INVENTION

1. Field of the Invention

The present invention relates to a thin-film magnetic head having at least a magnetoresistive element for reading and a method of manufacturing such a thin-film magnetic head, and to a magnetoresistive device having a magnetoresistive element.

2. Description of the Related Art

Performance improvements in thin-film magnetic heads have been sought as surface recording density of hard disk drives has increased. Composite thin-film magnetic heads have been widely used. A composite head is made of a layered structure including a recording head having an induction-type magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

Many of reproducing heads have a structure in which the MR element is electrically and magnetically shielded by a magnetic material.

Reference is now made to FIG. 14A to FIG. 19A and FIG. 14B to FIG. 19B to describe an example of a manufacturing method of a composite thin-film magnetic head as an example of a related-art manufacturing method of a thin-film magnetic head. FIG. 1 to FIG. 19A are cross sections each orthogonal to the air bearing surface of the head. FIG. 14B to FIG. 19B are cross sections each parallel to the air bearing surface of the pole portion of the head.

According to the manufacturing method, as shown in FIG. 14A and FIG. 14B, an insulating layer 102 made of alumina ($Al_2O_3$), for example, having a thickness of about 5 to 10 $\mu$m is deposited on a substrate 101 made of aluminum oxide and titanium carbide ($Al_2O_3$-TiC), for example. On the insulating layer 102 a bottom shield layer 103 made of a magnetic material and having a thickness of 2 to 3 $\mu$m is formed for a reproducing head.

Next, on the bottom shield layer 103, a first bottom shield gap film 104a as an insulating layer made of alumina, for example, is deposited to a thickness of 40 to 70 nm, for example. On the first bottom shield gap film 104a, an MR film having a thickness of tens of nanometers is formed for making an MR element 105 for reproduction. Next, on the MR film a photoresist pattern 106 is selectively formed where the MR element 105 is to be formed. The photoresist pattern 106 is formed into a shape that facilitates lift-off, such as a shape having a T-shaped cross section. Next, with the photoresist pattern 106 as a mask, the MR film is etched through ion milling, for example, to form the MR element 105. The MR element 105 may be either a GMR element or an AMR element.

Next, as shown in FIG. 15A and FIG. 15B, a second bottom shield gap film 104b as an insulating layer is formed in a region on top of the first bottom shield gap film 104a except the neighborhood of the MR element 105. The second bottom shield gap film 104b is made of alumina, for example, and has a thickness of 100 to 200 nm, for example. Next, using the photoresist pattern 106 as a mask, a pair of first conductive layers (that may be called leads) 107 whose thickness is 50 to 100 nm, for example, are formed into specific patterns on the first bottom shield gap film 104a and the second bottom shield gap film 104b. The first conductive layers 107 are electrically connected to the MR element 105 and may be made of copper (Cu), for example.

Next, as shown in FIG. 16A and FIG. 16B, the photoresist pattern 106 is lifted off. Next, a first top shield gap film 108a made of alumina, for example, and having a thickness of 40 to 70 nm, for example, is formed as an insulating layer on the bottom shield gap films 104a and 104b, the MR element 105 and the first conductive layers 107. The MR element 105 is embedded in the shield gap films 104a and 108a. Next, a second top shield gap film 108b as an insulating layer is formed in a region on top of the first top shield gap film 108a except the neighborhood of the MR element 105. The second top shield gap film 108b is made of alumina, for example, and has a thickness of 100 to 200 nm, for example.

Next, as shown in FIG. 17A and FIG. 17B, contact holes 130 are formed through selectively etching portions of the top shield gap films 108a and 108b located on top of an end of each of the first conductive layers 107 opposite to the MR element 105 (that is, on the right side of FIG. 17A). The first conductive layers 107 are thus exposed.

Next, as shown in FIG. 18A and FIG. 18B, on the top shield gap films 108a and 108b, a top-shield-layer-cum-bottom-pole-layer (called a top shield layer in the following description) 109 having a thickness of about 3 $\mu$m is formed. The top shield layer 109 is made of a magnetic material and used for both a reproducing head and a recording head. At the same time, a pair of second conductive layers 110 having a thickness of about 3 $\mu$m are formed on the bottoms of the contact holes 130 (FIG. 17A). The second conductive layers 110 are made of the same material as the top shield layer 109 and electrically connected to the first conductive layers 107. Next, an insulating layer 112 made of alumina, for example, and having a thickness of 4 to 6 $\mu$m, for example, is formed over the entire surface. The insulating layer 112 is flattened through chemical mechanical polishing (CMP), for example, until the top shield layer 109 and the second conductive layers 110 are exposed, and the surface is flattened.

Next, as shown in FIG. 19A and FIG. 19B, on the top shield layer 109, a recording gap layer 113 made of an insulating film such as an alumina film whose thickness is 0.2 to 0.3 $\mu$m is formed. Contact holes are formed through selectively etching a portion of the recording gap layer 113 in a center region where a thin-film coil described later is formed and portions on top of the second conductive layers 110. Next, third conductive layers 114 connected to the second conductive layers 110 are formed in the contact holes provided on top of the second conductive layers 110.

Next, on the recording gap layer 113, a photoresist layer 115 for determining the throat height is formed into a specific pattern whose thickness is about 1.0 to 2.0 $\mu$m. The throat height is the length (height) of portions of the two magnetic layers of the recording head between the air-bearing-surface-side end and the other end, the portions facing each other with the recording gap layer in between.

Next, on the photoresist layer 115, the thin-film coil 116 of the recording head is formed. The thickness of the coil 116 is 3 $\mu$m, for example. Next, a photoresist layer 117 is formed into a specific pattern on the photoresist layer 115, the coil 116 and the third conductive layers 114.

Next, a top pole layer 118 having a thickness of about 3 μm is formed for the recording head on the recording gap layer 113 and the photoresist layers 115 and 117. The top pole layer 118 is made of a magnetic material such as Permalloy (NiFe) and is in contact with and magnetically coupled to the top shield layer (bottom pole layer) 109 through the contact hole formed in the center portion of the region where the thin-film coil 116 is formed.

Next, the recording gap layer 113 and the top shield layer (bottom pole layer) 109 are etched through ion milling, for example, using the top pole layer 118 as a mask. As shown in FIG. 19B, the structure is called a trim structure wherein the sidewalls of the top pole layer 118, the recording gap layer 113, and part of the top shield layer (bottom pole layer) 109 are formed vertically in a self-aligned manner. The trim structure suppresses an increase in the effective track width due to expansion of the magnetic flux generated during writing in a narrow track.

Next, an overcoat layer 119 of alumina, for example, having a thickness of 20 to 30 μm is formed to cover the top pole layer 118. The surface of the overcoat layer 119 is flattened and pads for electrodes not shown are formed on the surface of the overcoat layer 119. Finally, machine processing (lapping) of the slider is performed to form the air bearing surfaces of the recording head and the reproducing head. The thin-film magnetic head is thus completed.

As the performance of a reproducing head improves, a problem of thermal asperity comes up. Thermal asperity is a reduction in reproducing characteristics due to self-heating of the reproducing head during reproduction. To overcome such thermal asperity, the thickness of each shield gap film has been reduced down to 40 to 70 nm, for example, in order to increase the cooling efficiency.

However, such thin shield gap films cause a problem that faults may result in the magnetic and electrical insulation that isolates the shield layers from the MR element or the first conductive layers connected thereto.

In relation to this problem, another problem of the prior-art thin-film magnetic head is a short circuit between the shield layers and the MR element or the first conductive layers connected thereto. This problem will now be described, referring to the example shown in FIG. 14A to FIG. 19A and FIG. 14B to FIG. 19B.

In the method of manufacturing the thin-film magnetic head of the related art, the top shield layer 109 and the second conductive layers 110 as shown in FIG. 18A and FIG. 18B are formed through plating, for example. In this case, before forming the plating layers of the top shield layer 109 and the second conductive layers 110, a seed layer required for growing the plating layers is formed through sputtering.

The second conductive layers 110 are electrically connected to the first conductive layers 107 through the contact holes 130 shown in FIG. 17A. Therefore, the ohmic resistance between the second conductive layers 110 and the first conductive layers 107 is required to be low. In order to achieve this through the related-art method, oxides on the surfaces of the first conductive layers 107 are removed through reverse sputtering before forming the seed layer on the first conductive layers 107. The ohmic resistance on the surfaces of the first conductive layers 107 is thereby reduced.

In the related art, however, portions of the top shield gap films 108a and 108b near the MR element 105 may be etched or suffer plasma-induced damage because of the reverse sputtering mentioned above. Holes are thus formed in the top shield gap films 108a and 108b in some cases. FIG. 20 illustrates the state in which the top shield gap films 108a and 108b have holes 140 near the MR element 105.

If the top shield layer 109 is formed while the top shield gap films 108a and 108b have the holes 140, a short circuit is created between the top shield layer 109 and the MR element 105 or the first conductive layers 107, as shown in FIG. 21. Such a short circuit results in an increase in noise that affects the MR element 105.

OBJECT AND SUMMARY OF THE INVENTION

It is an object of the invention to provide a thin-film magnetic head and a method of manufacturing the same and a magnetoresistive device for preventing a short circuit between a shield layer and a magnetoresistive element or a first conductive layer connected thereto.

A thin-film magnetic head of the invention comprises: a magnetoresistive element; two shield layers, placed to face each other with the magnetoresistive element in between, for shielding the magnetoresistive element; a first conductive layer connected to the magnetoresistive element; two insulating layers each of which is provided between each of the shield layers and the magnetoresistive element and the first conductive layer, one of the insulating layers having a contact hole; and a second conductive layer connected to the first conductive layer through the contact hole of the one of the insulating layers. One of the shield layers located closer to the one of the insulating layers than the other one of the shield layers includes: a first layer touching the one of the insulating layers; and a second layer made of a material the same as a material of which the second conductive layer is made.

According to the thin-film magnetic head of the invention, the first layer of the one of the shield layers is provided to touch the one of the insulating layers having the contact hole. As a result, the one of the insulating layers is protected by the first layer of the one of the shield layers when the second conductive layer made of the same material as that of the second layer of the one of the shield layers is formed.

The thin-film magnetic head of the invention may further comprise a base layer that is a base of the second conductive layer and made of a material the same as a material of which the first layer of the one of the shield layers is made. In this case, the contact hole penetrates the base layer and the one of the insulating layers.

The thin-film magnetic head may further comprise an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers. In this case, the one of the shield layers may function as one of the magnetic layers, too.

A method of the invention is provided for manufacturing a thin-film magnetic head comprising: a magnetoresistive element; a first shield layer and a second shield layer, placed to face each other with the magnetoresistive element in between, for shielding the magnetoresistive element; a first conductive layer connected to the magnetoresistive element; a first insulating layer provided between the first shield layer and the magnetoresistive element and the first conductive layer; a second insulating layer provided between the second shield layer and the magnetoresistive element and the first conductive layer, the second insulating layer having a contact hole; and a second conductive layer connected to the first conductive layer through the contact hole of the second insulating layer. The method includes the steps of: forming the first shield layer; forming the first insulating layer on the first shield layer; forming the magnetoresistive element on the first insulating layer; forming the first conductive layer on the first insulating layer; forming the second insulating layer on the magnetoresistive element, the first conductive layer and the first insulating layer; forming a first layer of the second shield layer on the second insulating layer; forming the contact hole in a portion of the second insulating layer that connects the first conductive layer to the second conductive layer after the step of forming the first layer of the second shield layer; forming a second layer of the second shield layer on the first layer of the second shield layer; and forming the second conductive layer to be connected to the first conductive layer through the contact hole.

According to the method of the invention, the contact hole is formed in the portion of the second insulating layer that connects the first conductive layer to the second conductive layer after the first layer of the second shield layer is formed on the second insulating layer. As a result, the second insulating layer is protected by the first layer of the second shield layer when the second conductive layer is formed.

According to the method, the second conductive layer may be formed through plating in the step of forming the second conductive layer.

The method may further include the step of performing processing of reducing an ohmic resistance of a portion of the first conductive layer to be connected to the second conductive layer prior to the step of forming the second conductive layer.

According to the method, the step of forming the second conductive layer may be performed at the same time as the step of forming the second layer of the second shield layer, and the second conductive layer may be made of a material the same as a material of which the second layer of the second shield layer is made.

According to the method, a base layer may be formed on a portion of the second insulating layer where the contact hole is to be formed at the same time as the step of forming the first layer of the second shield layer. The base layer is a base of the second conductive layer and made of a material the same as a material of which the first layer of the second shield layers is made. In this case, the contact hole is formed to penetrate the base layer and the second insulating layer in the step of forming the contact hole.

The method may further include the step of forming an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers. In this case, the second shield layer may function as one of the magnetic layers, too.

A magnetoresistive device of the invention comprises: a magnetoresistive element; two shield layers, placed to face each other with the magnetoresistive element in between, for shielding the magnetoresistive element; a first conductive layer connected to the magnetoresistive element; two insulating layers each of which is provided between each of the shield layers and the magnetoresistive element and the first conductive layer, one of the insulating layers having a contact hole; and a second conductive layer connected to the first conductive layer through the contact hole of the one of the insulating layers. One of the shield layers located closer to the one of the insulating layers than the other one of the shield layers includes: a first layer touching the one of the insulating layers; and a second layer made of a material the same as a material of which the second conductive layer is made.

According to the magnetoresistive device of the invention, the first layer of the one of the shield layers is provided to touch the one of the insulating layers having the contact hole. As a result, the one of the insulating layers is protected by the first layer of the one of the shield layers when the second conductive layer made of the same material as that of the second layer of the one of the shield layers is formed.

The magnetoresistive device of the invention may further comprise a base layer that is a base of the second conductive layer and made of a material the same as a material of which the first layer of the one of the shield layers is made. In this case, the contact hole penetrates the base layer and the one of the insulating layers.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 14A and FIG. 14B are cross sections for illustrating a step in a method of manufacturing a thin-film magnetic head of related art.

FIG. 15A and FIG. 15B are cross sections for illustrating a step that follows FIG. 14A and FIG. 14B.

FIG. 16A and FIG. 16B are cross sections for illustrating a step that follows FIG. 15A and FIG. 15B.

FIG. 17A and FIG. 17B are cross sections for illustrating a step that follows FIG. 16A and FIG. 16B.

DETAILED DESCRIPTION OF THE PREFERRED EMBODIMENT

Figures 7A, 7B:
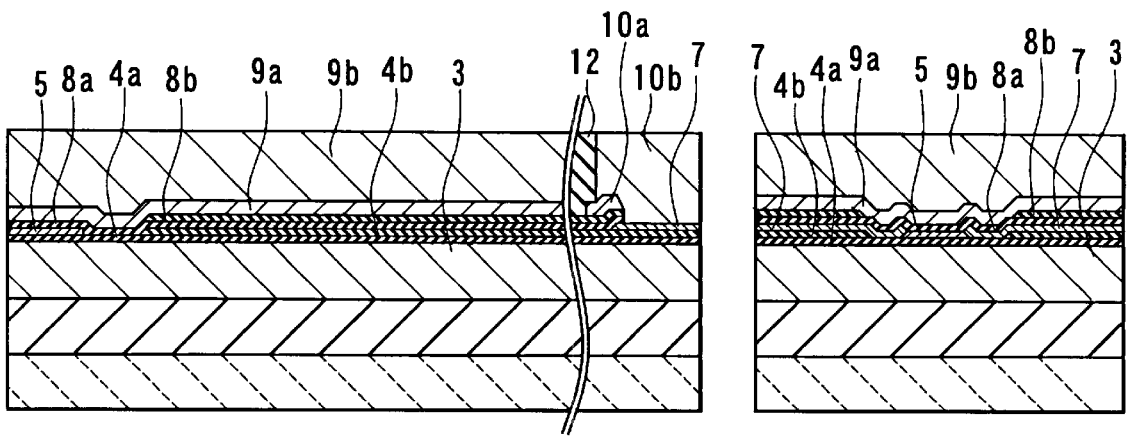
FIG. 7A and FIG. 7B are cross sections for illustrating a step that follows FIG. 6A and FIG. 6B.

A preferred embodiment of the invention will now be described in detail with reference to the accompanying drawings. Reference is now made to FIG. 1A to FIG. 10A, FIG. 1B to FIG. 10B, and FIG. 11 to FIG. 13 to describe a thin-film magnetic head and a method of manufacturing the same, and a magnetoresistive device of an embodiment of the invention. FIG. 1A to FIG. 10A are cross sections each orthogonal to the air bearing surface of the thin-film magnetic head. FIG. 1B to FIG. 10B are cross sections each parallel to the air bearing surface of the pole portion of the head.

In the method of the embodiment, as shown in FIG. 1A and FIG. 1B, an insulating layer 2 made of alumina ($Al_2O_3$), for example, having a thickness of about 5 to 10 $\mu$m is deposited on a substrate 1 made of aluminum oxide and titanium carbide ($Al_2O_3$-TiC), for example. On the insulating layer 2 a bottom shield layer 3 made of a magnetic material and having a thickness of 2 to 3 $\mu$m is formed for a reproducing head.

Next, as shown in FIG. 2A and FIG. 2B, on the bottom shield layer 3, a first bottom shield gap film 4a as an insulating layer made of alumina, for example, is deposited to a thickness of 40 to 70 nm, for example. On the first bottom shield gap film 4a, an MR film having a thickness of tens of nanometers is formed for making an MR element 5 for reproduction. Next, on the MR film a photoresist pattern 6 is selectively formed where the MR element 5 is to be formed. The photoresist pattern 6 is formed into a shape that facilitates lift-off, such as a shape having a T-shaped cross section. Next, with the photoresist pattern 6 as a mask, the MR film is etched through ion milling, for example, to form the MR element 5. The MR element 5 may be any of an AMR element, a GMR element and a tunnel magnetoresistive (TMR) element and so on that are made of magneto-sensitive films exhibiting magnetoresistivity.

Next, as shown in FIG. 3A and FIG. 3B, a second bottom shield gap film 4b as an insulating layer is formed in a region on top of the first bottom shield gap film 4a except the neighborhood of the MR element 5. The second bottom shield gap film 4b is made of alumina, for example, and has a thickness of 100 to 200 nm, for example. Next, using the photoresist pattern 6 as a mask, a pair of first conductive layers (that may be called leads) 7 whose thickness is 50 to 100 nm, for example, are formed into specific patterns on the first bottom shield gap film 4a and the second bottom shield gap film 4b. The first conductive layers 7 are electrically connected to the MR element 5 and may be made of copper (Cu), for example. Next, as shown in FIG. 4A and FIG. 4B, the photoresist pattern 6 is lifted off.

Next, as shown in FIG. 5A and FIG. 5B, a first top shield gap film 8a made of alumina, for example, and having a thickness of 40 to 70 nm, for example, is formed as an insulating layer on the bottom shield gap films 4a and 4b, the MR element 5 and the first conductive layers 7. The MR element 5 is embedded in the shield gap films 4a and 8a. Next, a second top shield gap film 8b as an insulating layer is formed in a region on top of the first top shield gap film 8a except the neighborhood of the MR element 5. The second top shield gap film 8b is made of alumina, for example, and has a thickness of 100 to 200 nm, for example.

Next, on the top shield gap films 8a and 8b, a first layer 9a of a top-shield-layer-cum-bottom-pole-layer (called a top shield layer in the following description) is formed through sputtering, for example. The top shield layer is used for both a reproducing head and a recording head. The first layer 9a is made of a magnetic material such as NiFe and has a thickness of 50 to 100 nm, for example. At the same time, base layers 10a as bases of second conductive layers described later are formed through sputtering, for example, on a portion of the top shield gap film 8b located on top of an end of each of the first conductive layers 7 opposite to the MR element 5 (that is, on the right side of FIG. 5A). The base layers 10a are made of the same material as the first layer 9a of the top shield layer and have a thickness of 50 to 100 nm, for example.

Next, as shown in FIG. 6A and FIG. 6B, contact holes 11 are formed through selectively etching inner portions of the base layer 10a except its periphery and portions of the top shield gap films 8a and 8b below the base layers 10a. The first conductive layers 7 are thus exposed through the contact holes 11. It is easy to form the contact holes 11 if the thickness of each of the base layers 10a is as thin as 50 to 100 nm as described above.

Figures 10A, 10B:
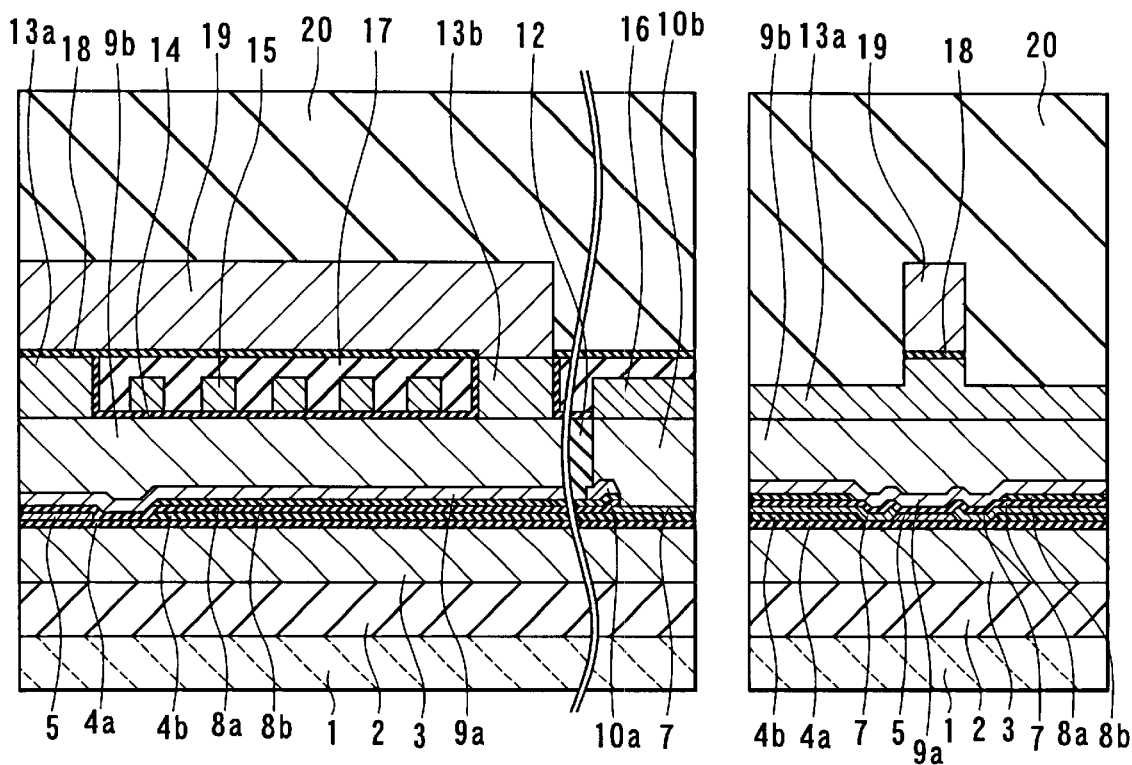
FIG. 10A and FIG. 10B are cross sections for illustrating a step that follows FIG. 9A and FIG. 9B.
Figure 11:
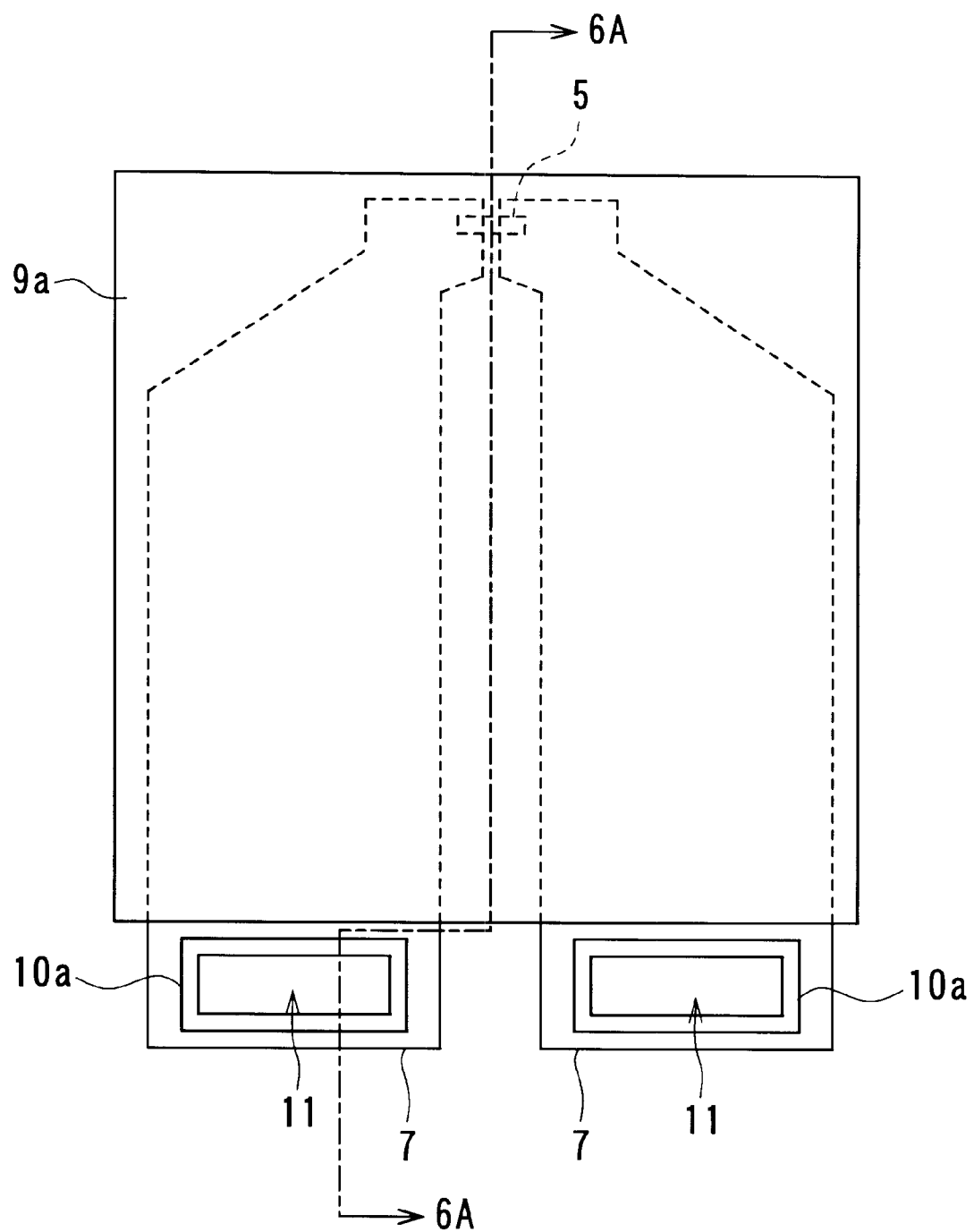
FIG. 11 is a top view corresponding to FIG. 6A and FIG. 6B.

FIG. 11 is a top view that corresponds to FIG. 6A and FIG. 6B and illustrates the state in which the steps taken until the formation of the contact holes 11 are completed. FIG. 1A to FIG. 10A are cross sections taken along line 6A—6A of FIG. 11.

Next, processing is performed for removing oxides on the surfaces of the first conductive layers 7 and thereby reducing the ohmic resistance on the surfaces of the first conductive layers 7. This processing may be performed through reverse sputtering using argon (Ar) as a discharge gas, for example.

Next, a seed layer (not shown) required for developing plating layers is formed through sputtering on the first layer 9a of the top shield layer and the base layers 10a and on the first conductive layers 7 exposed through the contact holes 11.

Next, as shown in FIG. 7A and FIG. 7B, a second layer 9b of the top shield layer is formed through plating on the first layer 9a of the top shield layer. The second layer 9b is made of a magnetic material such as NiFe and has a thickness of about 3 $\mu$m. At the same time, second conductive layers 10b having a thickness of about 3 $\mu$m are formed through plating on the base layers 10a and on the bottoms of the contact holes 11 (FIG. 6A). The second conductive layers 10b are made of the same material as the second layer 9b of the top shield layer and electrically connected to the first conductive layers 7.

Next, an insulating layer 12 made of alumina, for example, and having a thickness of 4 to 6 $\mu$m, for example, is formed over the entire surface. The insulating layer 12 is polished through chemical mechanical polishing (CMP), for example, until the second layer 9b of the top shield layer and the second conductive layers 10b are exposed, and the surface is flattened.

Figure 12:
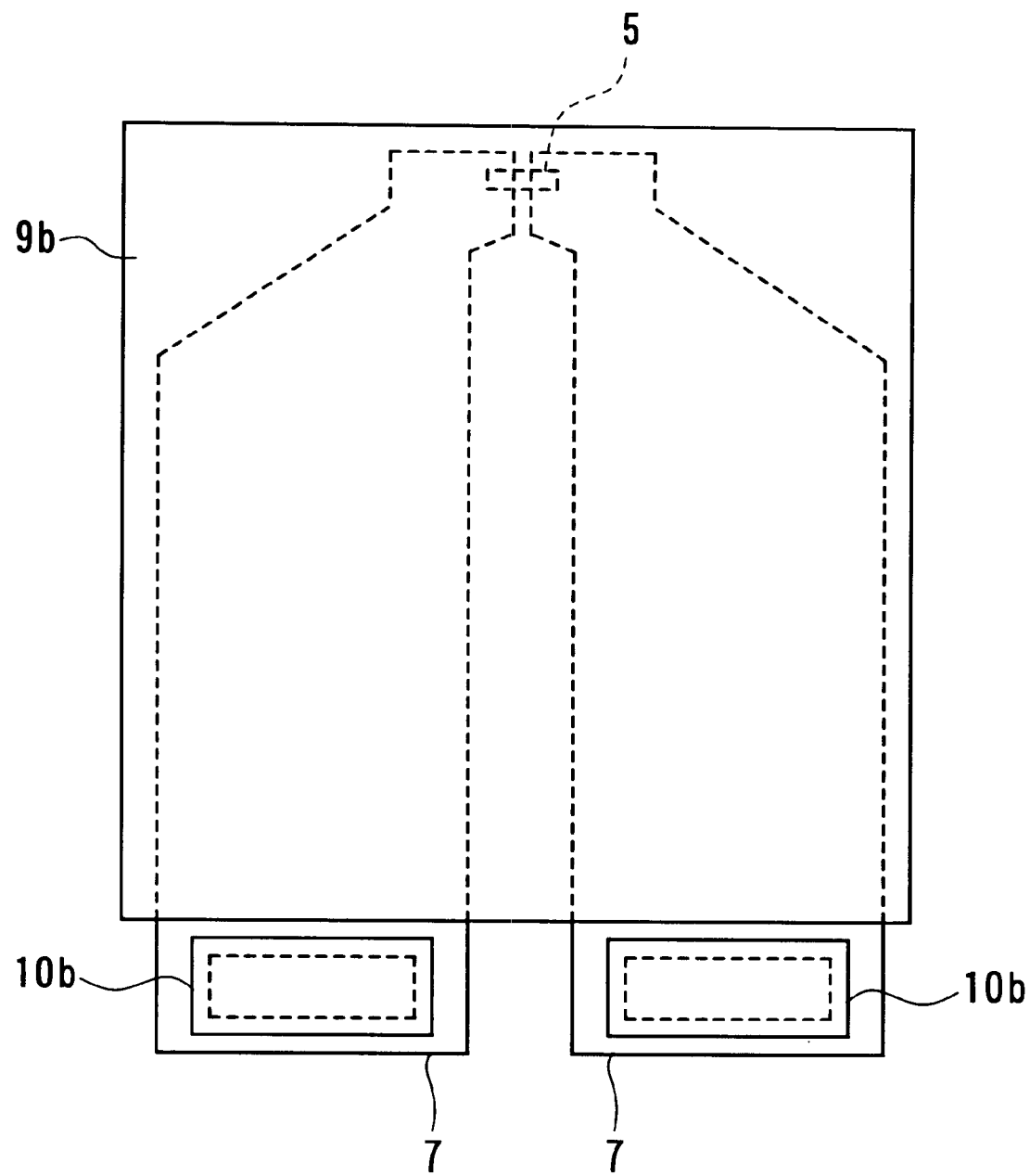
FIG. 12 is a top view corresponding to FIG. 7A and FIG. 7B.

FIG. 12 is a top view corresponding to FIG. 7A and FIG. 7B, wherein the insulating layer 12 is omitted.

Figures 8A, 8B:
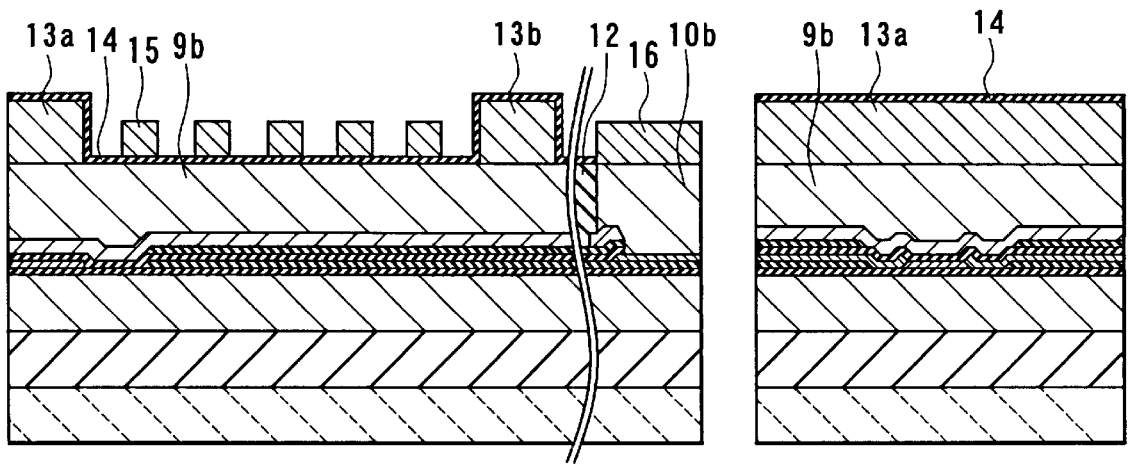
FIG. 8A and FIG. 8B are cross sections for illustrating a step that follows FIG. 7A and FIG. 7B.

Next, as shown in FIG. 8A and FIG. 8B, on the second layer 9b of the top shield layer, a bottom pole tip 13a making up the pole portion of the bottom pole layer (the top shield layer) is formed near the air-bearing-surface-side end (on the left side of FIG. 8A). At the same time, a magnetic layer 13b is formed in a center portion of the region where a thin-film coil described later is to be formed. The thickness of each of the bottom pole tip 13a and the magnetic layer 13b is about 1.5 to 2.5 µm, for example. The magnetic layer 13b is a portion for connecting the second layer 9b of the top shield layer to a top pole layer described later. In this embodiment the zero throat height position, that is, the position of an end of the pole portion opposite to the air bearing surface, is the position of an end of the bottom pole tip 13a opposite to the air bearing surface (that is, on the right side of FIG. 8A).

The bottom pole tip 13a and the magnetic layer 13b are part of the top shield layer (bottom pole layer). The bottom pole tip 13a and the magnetic layer 13b may be formed through plating with NiFe (80 weight % Ni and 20 weight % Fe) or NiFe (45 weight % Ni and 55 weight % Fe) as a high saturation flux density material, or through sputtering a high saturation flux density material such as FeN or FeZrN. Alternatively, a high saturation flux density material such as CoFe or a Co-base amorphous material may be used.

Next, an insulating film 14 made of alumina, for example, having a thickness of about 0.3 to 0.6 µm is formed over the entire surface.

Figure 13:
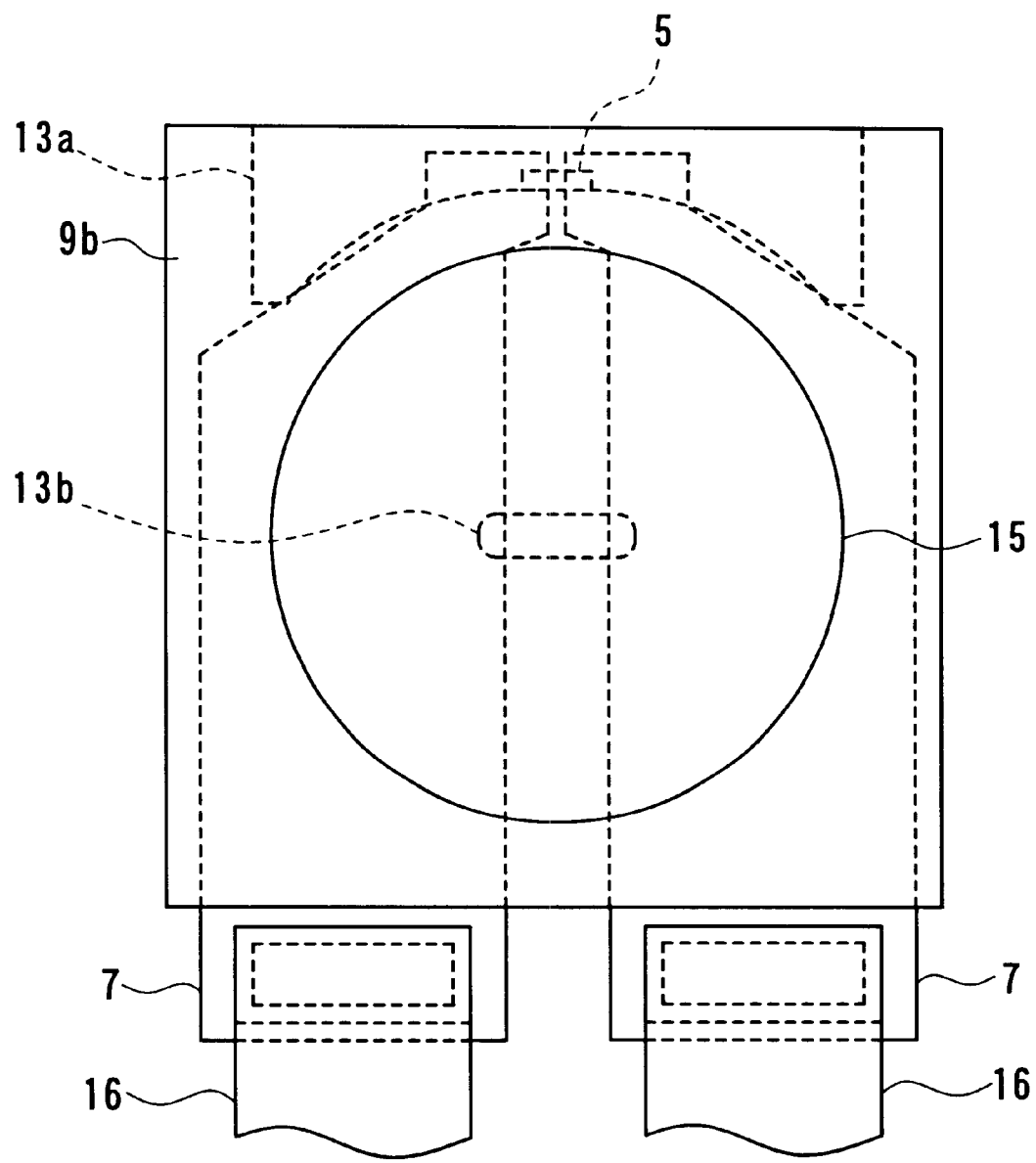
FIG. 13 is a top view corresponding to FIG. 8A and FIG. 8B.
Figures 18A, 18B:
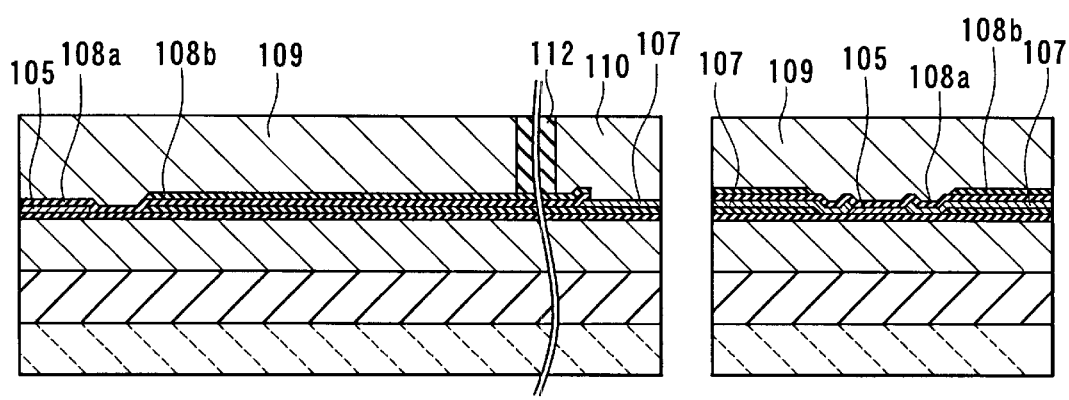
FIG. 18A and FIG. 18B are cross sections for illustrating a step that follows FIG. 17A and FIG. 17B.
Figures 19A, 19B:
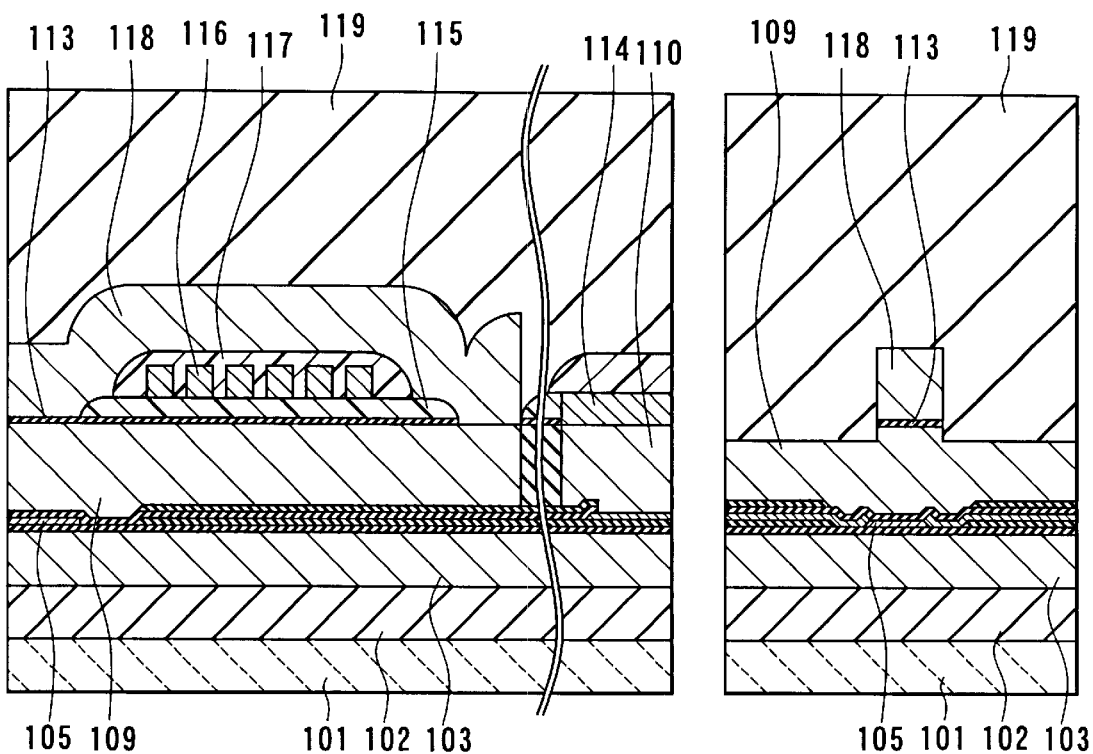
FIG. 19A and FIG. 19B are cross sections for illustrating a step that follows FIG. 18A and FIG. 18B.
Figure 20:
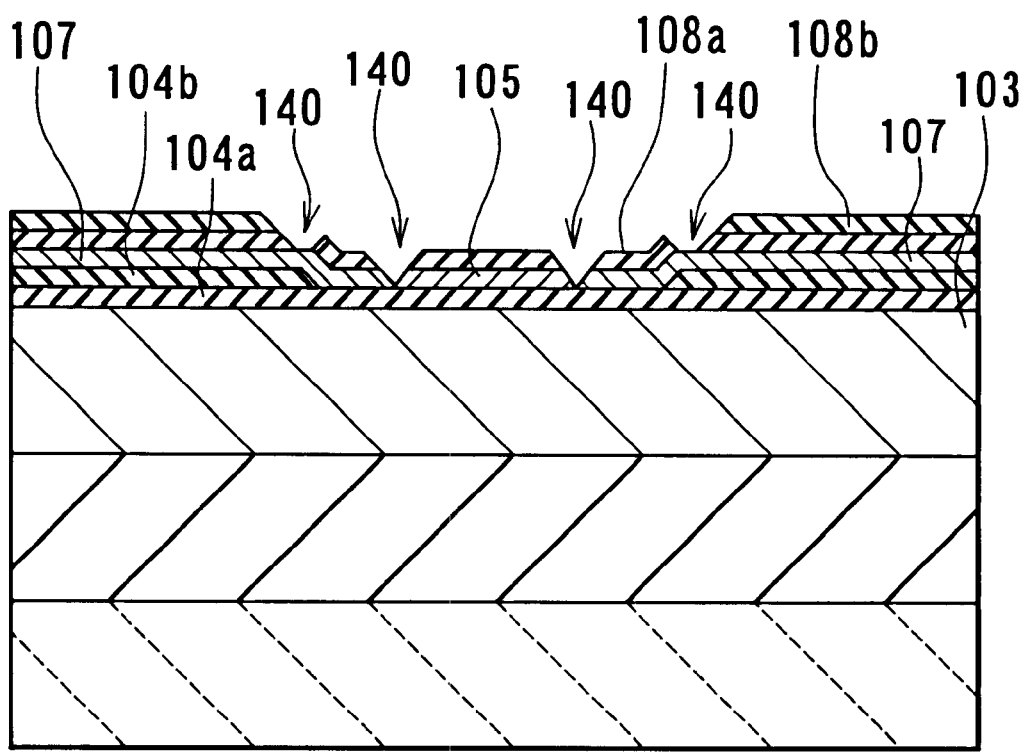
FIG. 20 is a cross section for describing a problem of the related art.
Figure 21:
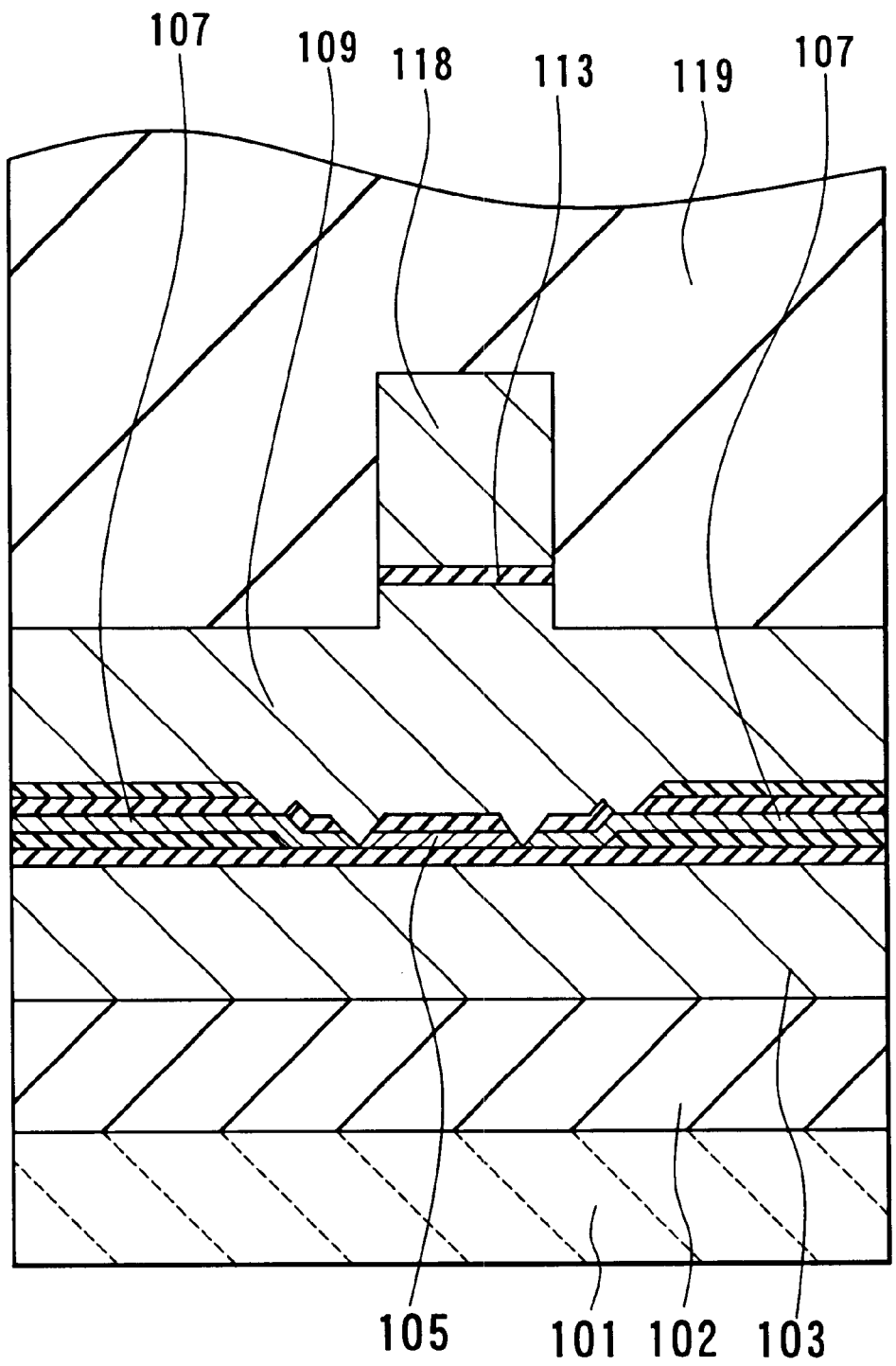
FIG. 21 is a cross section for describing the problem of the related art.

Next, the thin-film coil 15 made of copper (Cu), for example, having a thickness of about 1.0 to 2.0 µm, for example, is formed through frame plating, for example. At the same time, third conductive layers 16 made of the same material as the coil 15 are formed on the second conductive layers 10b. The third conductive layers 16 have a thickness of about 1.0 to 2.0 µm, for example. The third conductive layers 16 are to be connected to pads for electrodes described later. FIG. 13 is a top view corresponding to FIG. 8A and FIG. 8B.

Figures 9A, 9B:
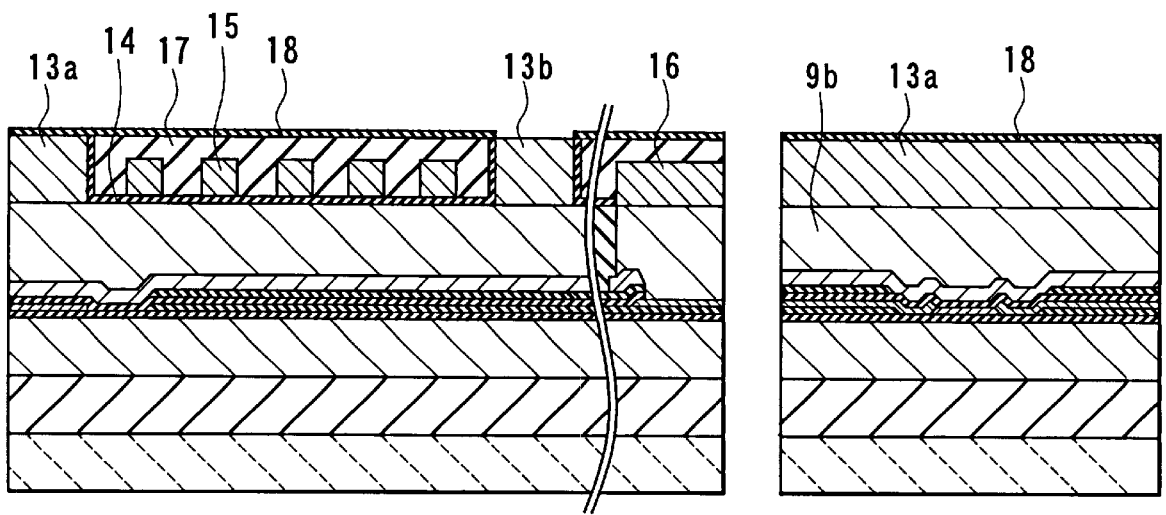
FIG. 9A and FIG. 9B are cross sections for illustrating a step that follows FIG. 8A and FIG. 8B.

Next, as shown in FIG. 9A and FIG. 9B, an insulating layer 17 of alumina, for example, having a thickness of about 3 to 4 µm is formed over the entire surface. The insulating layer 17 is then polished through CMP, for example, until the bottom pole tip 13a and the magnetic layer 13b are exposed, and the surface is flattened. Although the coil 15 is not exposed in FIG. 9A and FIG. 9B, the coil 15 may be exposed. If the coil 15 is exposed, another insulating layer is formed on the coil 15 and the insulating layer 17.

Next, a recording gap layer 18 made of an insulating material whose thickness is about 0.2 to 0.3 µm, for example, is formed on the bottom pole tip 13a and the magnetic layer 13b exposed and the insulating layer 17. In general, the insulating material used for the recording gap layer 18 may be alumina, aluminum nitride, a silicon-dioxide-base material, a silicon-nitride-base material, or diamond-like carbon (DLC) and so on.

Next, a portion of the recording gap layer 18 located on the magnetic layer 13b is etched to form a contact hole for making the magnetic path.

Next, as shown in FIG. 10A and FIG. 10B, the top pole layer 19 made of a magnetic material and having a thickness of about 2 to 4 µm, for example, is formed into a specific pattern on the recording gap layer 18. The top pole layer 19 may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

The top pole layer 19 includes: the pole portion located to face the bottom pole tip 13a, the recording gap layer 18 being placed between the pole portion and the bottom pole tip 13a; and the yoke portion connected to the pole portion and located in a region facing the thin-film coil 15. The portion connecting the pole portion to the yoke portion is located in the zero throat height position or in the neighborhood thereof. The pole portion has a narrow specific width. This width of the pole portion defines the track width of the recording head.

Next, the recording gap layer 18 is selectively etched through dry etching, using the top pole layer 19 as a mask. Furthermore, the second layer 9b of the top shield layer is selectively etched by about 0.3 to 0.6 µm through argon ion milling, for example. A trim structure as shown in FIG. 10B is thus formed. The trim structure suppresses an increase in the effective track width due to expansion of a magnetic flux generated during writing in a narrow track.

Next, an overcoat layer 20 of alumina, for example, having a thickness of 20 to 40 µm is formed over the entire surface. The surface of the overcoat layer 20 is then flattened and pads (not shown) for electrodes are formed on the overcoat layer 20. Finally, lapping of the slider is performed to form the air bearing surfaces of the recording head and the reproducing head. The thin-film magnetic head of the embodiment is thus completed.

The bottom shield layer 3 corresponds to a first shield layer of the invention. The top shield layer (bottom pole layer) including the first layer 9a, the second layer 9b, the bottom pole tip 13a and the magnetic layer 13b corresponds to a second shield layer of the invention. The bottom shield gap films 4a and 4b correspond to a first insulating layer of the invention. The top shield gap films 8a and 8b correspond to a second insulating layer of the invention.

The top shield layer (bottom pole layer), the recording gap layer 18, the top pole layer 19 and the thin-film coil 15 correspond to an induction-type magnetic transducer of the invention.

As described so far, the thin-film magnetic head of the embodiment comprises the reproducing head and the recording head. The reproducing head includes: the MR element 5; and the bottom shield layer 3 and the top shield layer (bottom pole layer) (9a, 9b, 13a and 13b) for shielding the MR element 5. Portions of the bottom shield layer 3 and the top shield layer facing toward a recording medium are opposed to each other, the MR element 5 being placed between the portions. The reproducing head further includes: the first conductive layers 7 connected to the MR element 5; the bottom shield gap films 4a and 4b placed between the bottom shield layer 3 and the MR element 5 and the first conductive layers 7; the top shield gap films 8a and 8b placed between the top shield layer and the MR element 5 and the first conductive layers 7; and the second conductive layers 10b connected to the first conductive layers 7 through the contact holes 11 (FIG. 6A) formed in the top shield gap films 8a and 8b. The reproducing head corresponds to a magnetoresistive device of the invention.

The recording head includes the bottom pole layer (top shield layer) (9a, 9b, 13a and 13b) and the top pole layer 19 magnetically coupled to each other, each of which includes at least one layer. The bottom pole layer and the top pole layer 19 include the pole portions opposed to each other and placed in regions on a side of the medium facing surface (air bearing surface) facing toward the recording medium. The recording head further includes: the recording gap layer 18 placed between the pole portion of the bottom pole layer and the pole portion of the top pole layer 19; and the thin-film coil 15 at least part of which is placed between the bottom pole layer and the top pole layer 19, the at least part of the coil 15 being insulated from the bottom pole layer and the top pole layer 19.

In the reproducing head of the embodiment the top shield layer includes: the first layer 9a touching the top shield gap films 8a and 8b; and the second layer 9b made of the same material as the second conductive layers 10b.

In the thin-film magnetic head of the embodiment, the first layer 9a of the top shield layer is provided to touch the top shield gap films 8a and 8b having the contact holes 11. According to the method of manufacturing the thin-film magnetic head of the embodiment, the first layer 9a of the top shield layer is formed on the top shield gap films 8a and 8b, and then the contact holes 11 are formed in the portions of the top shield gap films 8a and 8b that connect the first conductive layers 7 to the second conductive layers 10b. As a result, portions of the top shield gap films 8a and 8b near the MR element 5 are protected by the first layer 9a of the top shield layer when processing is performed to reduce the ohmic resistance on the surfaces of the first conductive layers 7 through reverse sputtering, for example.

Therefore, the embodiment of the invention prevents formation of holes in the top shield gap films 8a and 8b near the MR element 5 due to etching or plasma-induced damage of the top shield gap films 8a and 8b when reverse sputtering is performed. It is thereby possible to prevent a short circuit between the top shield layer and the MR element 5 or the first conductive layers 7 connected thereto. The embodiment further prevents the MR element 5 from directly suffering plasma-induced damage. As thus described, the embodiment is effective for reducing noise affecting the MR element 5.

According to the embodiment, it is possible to make the thickness of each of the bottom shield gap films 4a and 4b and the top shield gap films 8a and 8b sufficiently thin in order to improve the thermal asperity. The performance of the reproducing head is thereby improved.

In the embodiment the thin-film coil 15 is placed on top of the second layer 9b of the top shield layer and on the side of the bottom pole tip 13a, and the top surface of the insulating layer 17 that covers the coil 15 is flattened. As a result, the top pole layer 19 is formed on the flat surface. Therefore, according to the embodiment, the dimensions of the pole portion of the top pole layer 19 may be reduced to the half-micron or quarter-micron order. The track width of the recording head is thereby reduced.

According to the embodiment, the throat height is not defined by the pole portion of the top pole layer 19 that defines the track width of the recording head, but by the bottom pole tip 13a. As a result, the throat height is uniformly defined with precision even if the track width is reduced.

According to the embodiment, the thin-film coil 15 is formed on the flat surface. It is thereby possible to reduce the size of the coil 15. A reduction in yoke length of the recording head is thereby achieved.

The present invention is not limited to the foregoing embodiment. For example, although each of the bottom shield gap film and the top shield gap film is made up of two layers in the foregoing embodiment, one or both of the bottom and top shield gap films may be made up of one layer or three layers or more.

In the foregoing embodiment the thin-film magnetic head disclosed comprises the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concavity is preferred for the thin-film magnetic head having such a structure. If the coil is formed in the concavity of the base body, the thin-film magnetic head is further reduced in size.

If the thin-film magnetic head is used for reading only, the head may comprise a magnetoresistive element for reading only.

The magnetoresistive device of the invention is not only limited to a reproducing head of a thin-film magnetic head but may be applied to a rotational position sensor, a magnetic sensor, a current sensor and so on. The method of manufacturing the magnetoresistive device of the invention is similar to that of the method of manufacturing the reproducing head of the thin-film magnetic head of the invention.

According to the thin-film magnetic head or the magnetoresistive device of the invention thus described, the first layer of one of the shield layers is provided to touch one of the insulating layers having a contact hole. As a result, the one of the insulating layers is protected by the first layer of the one of the shield layers when the second conductive layer made of the same material as the second layer of the one of the shield layers is formed. It is thereby possible to prevent a short circuit between the shield layer and the magnetoresistive element or the first conductive layer connected thereto.

According to the method of manufacturing the thin-film magnetic head of the invention, the first layer of the second shield layer is formed on the second insulating layer, and then a contact hole is formed in the portion of the second insulating layer that connects the first conductive layer to the second conductive layer. As a result, the second insulating layer is protected by the first layer of the second shield layer when the second conductive layer is formed. It is thereby possible to prevent a short circuit between the shield layer and the magnetoresistive element or the first conductive layer connected thereto.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a magnetoresistive element;
   two shield layers, placed to face each other with the magnetoresistive element in between, for shielding the magnetoresistive element;
   a first conductive layer connected to the magnetoresistive element;

two insulating layers each of which is provided between each of the shield layers and the magnetoresistive element and the first conductive layer, one of the insulating layers having a contact hole; and a second conductive layer connected to the first conductive layer through the contact hole of the one of the insulating layers; wherein one of the shield layers located closer to the one of the insulating layers than the other one of the shield layers includes: a first layer touching the one of the insulating layers; and a second layer made of a material the same as a material of which the second conductive layer is made.

2. The thin-film magnetic head according to claim 1, further comprising a base layer that is a base of the second conductive layer and made of a material the same as a material of which the first layer of the one of the shield layers is made, wherein the contact hole penetrates the base layer and the one of the insulating layers.

3. The thin-film magnetic head according to claim 1, further comprising an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

4. The thin-film magnetic head according to claim 3 wherein the one of the shield layers functions as one of the magnetic layers, too.

5. A method of manufacturing a thin-film magnetic head comprising: a magnetoresistive element; a first shield layer and a second shield layer, placed to face each other with the magnetoresistive element in between, for shielding the magnetoresistive element; a first conductive layer connected to the magnetoresistive element; a first insulating layer provided between the first shield layer and the magnetoresistive element and the first conductive layer; a second insulating layer provided between the second shield layer and the magnetoresistive element and the first conductive layer, the second insulating layer having a contact hole; and a second conductive layer connected to the first conductive layer through the contact hole of the second insulating layer; the method including the steps of:

forming the first shield layer;
forming the first insulating layer on the first shield layer;
forming the magnetoresistive element on the first insulating layer;
forming the first conductive layer on the first insulating layer;
forming the second insulating layer, on the magnetoresistive element, the first conductive layer and the first insulating layer;
forming a first layer of the second shield layer on the second insulating layer;
forming the contact hole in a portion of the second insulating layer that connects the first conductive layer to the second conductive layer after the step of forming the first layer of the second shield layer;
forming a second layer of the second shield layer on the first layer of the second shield layer; and
forming the second conductive layer to be connected to the first conductive layer through the contact hole.

6. The method according to claim 5 wherein the second conductive layer is formed through plating in the step of forming the second conductive layer.

7. The method according to claim 5, further including the step of performing processing of reducing an ohmic resistance of a portion of the first conductive layer to be connected to the second conductive layer prior to the step of forming the second conductive layer.

8. The method according to claim 5 wherein the step of forming the second conductive layer is performed at the same time as the step of forming the second layer of the second shield layer, and the second conductive layer is made of a material the same as a material of which the second layer of the second shield layer is made.

9. The method according to claim 5 wherein:

a base layer is formed on a portion of the second insulating layer where the contact hole is to be formed at the same time as the step of forming the first layer of the second shield layer, the base layer being a base of the second conductive layer and made of a material the same as a material of which the first layer of the second shield layer is made; and the contact hole is formed to penetrate the base layer and the second insulating layer in the step of forming the contact hole.

10. The method according to claim 5, further including the step of forming an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

11. The method according to claim 10 wherein the second shield layer functions as one of the magnetic layers, too.

12. A magnetoresistive device comprising:

a magnetoresistive element;

two shield layers, placed to face each other with the magnetoresistive element in between, for shielding the magnetoresistive element;

a first conductive layer connected to the magnetoresistive element;

two insulating layers each of which is provided between each of the shield layers and the magnetoresistive element and the first conductive layer, one of the insulating layers having a contact hole; and a second conductive layer connected to the first conductive layer through the contact hole of the one of the insulating layers; wherein one of the shield layers located closer to the one of the insulating layers than the other one of the shield layers includes: a first layer touching the one of the insulating layers; and a second layer made of a material the same as a material of which the second conductive layer is made.

13. The magnetoresistive device according to claim 12, further comprising a base layer that is a base of the second conductive layer and made of a material the same as a material of which the first layer of the one of the shield layers is made, wherein the contact hole penetrates the base layer and the one of the insulating layers.

* * * * *